US009181363B2

(12) United States Patent
Galiano et al.

(10) Patent No.: US 9,181,363 B2
(45) Date of Patent: Nov. 10, 2015

(54) PROCESS FOR PREPARING NOVEL COPOLYMERS WITH A FLUOROPOLYMER BACKBONE COMPRISING POLYOXYALKYLENE PENDANT CHAINS

(75) Inventors: Herve Galiano, La Ville Aux Dames (FR); Bruno Ameduri, Montpellier (FR); Jérôme Vergnaud, Perpignan (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 179 days.

(21) Appl. No.: 13/811,027

(22) PCT Filed: Jul. 19, 2011

(86) PCT No.: PCT/EP2011/062294
§ 371 (c)(1),
(2), (4) Date: Feb. 28, 2013

(87) PCT Pub. No.: WO2012/010569
PCT Pub. Date: Jan. 26, 2012

(65) Prior Publication Data
US 2013/0150544 A1    Jun. 13, 2013

(30) Foreign Application Priority Data

Jul. 21, 2010   (FR) ..................................... 10 55964

(51) Int. Cl.
| | | |
|---|---|---|
| *C08F 214/18* | (2006.01) | |
| *C08F 14/22* | (2006.01) | |
| *C08F 214/22* | (2006.01) | |
| *C08F 220/22* | (2006.01) | |
| *C08F 20/22* | (2006.01) | |
| *C08F 220/30* | (2006.01) | |

(52) U.S. Cl.
CPC .................. *C08F 14/22* (2013.01); *C08F 20/22* (2013.01); *C08F 214/18* (2013.01); *C08F 214/22* (2013.01); *C08F 220/22* (2013.01); *C08F 2220/306* (2013.01)

(58) Field of Classification Search
CPC .................. C08F 214/22; C08F 220/22; C08F 2220/306; C08F 20/22
USPC .......................................... 560/219; 526/246
See application file for complete search history.

(56) References Cited

U.S. PATENT DOCUMENTS

| | | | | |
|---|---|---|---|---|
| 2,956,939 | A | * | 10/1960 | Anspon .......................... 522/182 |
| 5,264,465 | A | * | 11/1993 | Futamura et al. ............. 523/106 |
| 2003/0064318 | A1 | * | 4/2003 | Huang et al. ................ 430/270.1 |
| 2003/0100791 | A1 | | 5/2003 | Harada et al. |
| 2003/0236369 | A1 | * | 12/2003 | Komoriya et al. ............. 526/246 |
| 2004/0191680 | A1 | * | 9/2004 | Araki et al. ................. 430/270.1 |
| 2010/0331479 | A1 | * | 12/2010 | Sugiyama et al. ............. 524/565 |
| 2011/0242654 | A1 | * | 10/2011 | Asahi et al. ............... 359/488.01 |
| 2012/0136077 | A1 | | 5/2012 | Soules et al. |
| 2012/0219878 | A1 | | 8/2012 | Tayouo et al. |

FOREIGN PATENT DOCUMENTS

WO     WO 2009113589 A1 *  9/2009

OTHER PUBLICATIONS

Thiebaut et al., "Reaction d'alcoolates sur les 2-perfluoroalkyl-ethanoate d'alkyle", Journal of Fluorine Chemistry, 1995, 73, 179-184.*
Translation of Thiebaut et al., Reaction of Alchoholates with Allkyl 2-Perfluoroalkylethanoates, Journal of Fluorine Chemistry 73, 179-184, Sep. 2014.*
Chen Y., et al., "Controlled Grafting from Poly(vinylidene fluoride) Films by Surface-Initiated Reversible Addition-Fragmentation Chain Transfer Polymerization", "Journal of Polymer Science: Part A: Polymer Chemistry", Mar. 22, 2006, pp. 3071-3082, vol. 44.
Liu, Y., et al., "Synthesis, characterization and electrochemical transport properties of the poly(ethyleneglycol)-grafted poly(vinylidenefluoride) nanoporous membranes", "Reactive and Functional Polymers", 2001, pp. 201-213, vol. 47.
Sannier, L., et al., "Evaluation of GPE performances in lithium metal battery technology by means of simple polarization tests", "Journal of Power Sources", Nov. 16, 2005, pp. 564-570, vol. 158.
Unpublished U.S. Appl. No. 13/823,991, filed Mar. 15, 2013.
Unpublished U.S. Appl. No. 13/878,578, filed Apr. 10, 2013.
Xiao, Q., et al., "Macroporous polymer electrolytes based on PVDF/PEO-b-PMMA block copolymer blends for rechargeable lithium ion battery", "Journal of Membrane Science", Mar. 4, 2009, pp. 117-122, vol. 334.

* cited by examiner

*Primary Examiner* — Nicole M Buie-Hatcher
(74) *Attorney, Agent, or Firm* — Hultquist, PLLC; Mary B. Grant

(57) ABSTRACT

The invention relates to novel copolymers and to an associated preparation method, comprising recurrent units bearing a pendant chain of the polyoxyalkylene type.

14 Claims, No Drawings

PROCESS FOR PREPARING NOVEL COPOLYMERS WITH A FLUOROPOLYMER BACKBONE COMPRISING POLYOXYALKYLENE PENDANT CHAINS

CROSS-REFERENCE TO RELATED APPLICATIONS

This application is a U.S. national phase under the provisions of 35 U.S.C. §371 of International Patent Application No. PCT/EP11/62294 filed Jul. 19, 2011, which in turn claims priority of French Patent Application No. 1055964 filed Jul. 21, 2010. The disclosures of such international patent application and French priority patent application are hereby incorporated herein by reference in their respective entireties, for all purposes.

TECHNICAL FIELD

The present invention relates to a method for preparing a copolymer comprising at least two recurrent unit types: a recurrent unit stemming from the polymerization of at least one monomer comprising one or more fluorine atoms and a recurrent unit stemming from the polymerization of at least one specific monomer comprising a polyoxyalkylene type pendant chain, to the copolymers which may be obtained by this method, to the specific monomers entering the application of this method and to a method for preparing said monomers.

The relevant copolymers because of the coexistence of these two types of recurrent units give the possibility of accessing a synergy of properties, whether this be in terms of mechanical, thermal and chemical resistance notably by means of the recurrent unit comprising one or more fluorine atoms or in terms of the capability of establishing complexes with ions notably by the recurrent unit comprising a pendant chain of the polyoxyalkylene type, which gives the possibility of contemplating the use of these copolymers in a large panel of applications.

Thus, these copolymers may find application in the following fields:
- the field of energy production, in particular secondary batteries, such as lithium batteries, where the copolymers of the invention may enter the composition of the electrolytes as an electrolyte gel and/or as a separator;
- the field of purification of liquids contaminated by ions to be removed, in which the copolymers may enter the composition of the filtration membranes;
- the field of aqueous latices, these aqueous latices may in particular be used as surfactants in extinguishing foams, paints or cosmetic compositions;
- the biological or biotechnological field;
- the field of compatibilizing or emulsifying adjuvants of systems comprising immiscible (co)polymers.

STATE OF THE PRIOR ART

As mentioned earlier, the presence of at least one recurrent unit comprising one or more fluorine atoms in a polymer contributes to giving it interesting properties in terms of mechanical, chemical and thermal resistance while the presence of at least one recurrent unit comprising polyoxyalkylene groups contributes to giving it interesting properties in terms of the capability of complexing ions and hydrophilic properties.

Therefore, quite naturally research turned towards the development of systems allowing coexistence of these two types of units, in order to access the aforementioned properties, whether this be:
i) in a separate form by the means of mixtures of polymers, for which at least one of the polymers comprises a recurrent unit type and at least one other polymer comprises the other type of recurrent unit with possible addition of a compatibilizing or emulsifying agent; or
ii) in an associated form within a same polymer by means of copolymers with a particular architecture comprising both of these recurrent unit types.

As regards i), certain authors have thus designed mixtures comprising a polymer based on fluorinated recurrent units and a polymer comprising recurrent units comprising a polyoxyalkylene group.

This is the case of Sannier et al. (J. Power Sources, 158 (2006) 564-570), who have described mixtures of two polymers, polyvinylidene fluoride (PVDF) and polyethylene oxide, respectively. However, because of the incompatibility between both of these polymers, the authors had to add to the system an agent of the dibutyl phthalate type.

This is also the case of Xiao et al. (Journal of Membrane Science, 334, (2009), 117-122), who describes membranes comprising PVDF in association with a copolymer comprising polyethylene oxide blocks and polymethyl methacrylate (symbolized as PMMA) blocks.

In both of these cases, the system is complex, since it requires the addition of several ingredients in order to attempt to benefit both from the properties stemming from PVDF and from the properties stemming from the ethylene oxide unit.

As regards ii), different architectures of copolymers have been elaborated, including copolymers with blocks comprising a block comprising ethylene oxide recurrent units and a block comprising units from vinylidene fluoride and also grafted copolymers comprising a main chain comprising units from vinylidene fluoride and grafts comprising ethylene oxide groups.

Thus, Kang et al., in React. Funct. Polym. 47 (2001), 201-213, describe the preparation of grafted copolymers comprising a main chain in polyvinylidene fluoride grafted with grafts comprising methacrylate recurrent units bearing a polyethylene oxide group, this preparation comprising:
- a step for ozonolysis of a polyvinylidene fluoride, so as to generate free radical groups of the peroxide or hydroperoxide type capable of generating free radicals capable of initiating a radical polymerization reaction in the presence of monomers;
- a step for putting the thereby treated polyvinylidene fluoride, in contact with methacrylate monomers bearing polyethylene oxide groups, the polymerization of these monomers propagating from free radical groups generated beforehand, in return for which the aforementioned grafted copolymers are obtained.

Other authors have set into place techniques for grafting a polyvinylidene fluoride involving a preliminary chemical modification of this polymer by the action of chemical reagents.

This is the case of Chen et al., in J. Polym. Sci., Part A: Polym. Chem. 44 (2006), 3071-3082, comprising the following steps:
- a step for chemical modification of a polyvinylidene fluoride consisting of attaching through a covalent bond on said polymer, pendant groups of the diazo-3-acidomethylcyanonitrile type, these groups being capable of initiating polymerization of methyl methacrylate;

a step for putting the thereby modified polyvinylidene fluoride in contact with methyl methacrylate, in return for which a polyvinylidene fluoride grafted with grafts of the polymethyl methacrylate type (known under the acronym of PVDF-g-PMMA) is obtained; and a step for transesterification of the ester groups borne by the grafts of the polymethyl methacrylate type with a hydroxylated polyethylene oxide compound, in return for which the grafts of the polymethyl methacrylate type include, at the end of this step, pendant groups of the polyethylene oxide type.

A quite significant complexity thus results from the techniques for preparing grafted copolymers mentioned above, because they involve several steps, which may prove to be bothersome for applying these techniques on an industrial scale, notably for reasons of cost and of processes (such as processes involving the use of ozone, of X or γ rays or transesterification processes requiring the use of metal complexes known to be toxic and not very respectful of the environment).

The authors thus set their goal to put in place a novel method for preparing copolymers comprising a main chain, comprising at least one recurrent unit stemming from the polymerization of a monomer comprising one or more fluorine atoms and at least one recurrent unit stemming from the polymerization of a monomer comprising a pendant group of the polyoxyalkylene type, this method being simple to apply notably in terms of the number of steps required for preparing the copolymer and not involving any chemical modification steps for the main chain, such as this is the case of the numerous preparation methods of the prior art involving a step for grafting the main chain.

DISCUSSION OF THE INVENTION

To do this, the authors of the present invention have set into place a method involving a simple copolymerization step notably applying an innovative specific monomer including a pendant group of the polyoxyalkylene type.

The invention thus relates to a method for preparing a copolymer comprising at least one recurrent unit fitting the following formula (I):

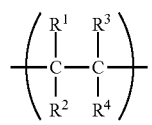

wherein:

$R^1$, $R^2$, $R^3$ and $R^4$ represent independently a hydrogen atom, a halogen atom, a perfluoroalkyl group or a perfluoroalkoxy group, provided that at least one of the groups $R^1$ to $R^4$ represents a fluorine atom, a perfluoroalkyl group or a perfluoroalkoxy group, and comprising at least one recurrent unit fitting the following formula (II):

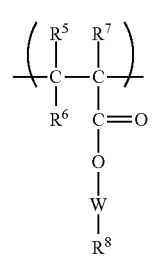

wherein:

$R^5$, $R^6$, $R^7$ represent, independently, a hydrogen atom, a halogen atom, an alkyl group, a perfluoroalkyl group, with the proviso that at least one of the groups $R^5$ to $R^7$ represents a fluorine atom or a perfluoroalkyl group;

W represents a polyoxyalkylene group; and $R^8$ represents an alkyl group or a hydrogen atom, said method comprising a step for copolymerization of at least one monomer of the following formula (III):

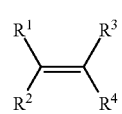

and of at least one monomer of the following formula (IV):

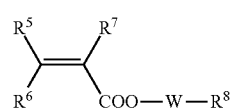

the groups $R^1$, $R^2$, $R^3$, $R^4$, $R^5$, $R^6$, $R^7$, W and $R^8$ being as defined above.

Before entering the description in more detail, we propose the following definitions.

By an alkyl group, is conventionally meant, in the foregoing and in the following, a linear or branched alkyl group of formula —$C_nH_{2n+1}$, n corresponding to the number of carbon atoms, this number may range from 1 to 5, such a group may be a methyl group.

By perfluoroalkyl group, is conventionally meant, in the foregoing and in the following, an alkyl group for which all the hydrogen atoms are replaced with fluorine atoms, this group fitting the formula —$C_nF_{2n+1}$, n corresponding to the number of carbon atoms, this number may range from 1 to 5, such a group may be a group of formula —$CF_3$.

By perfluoroalkoxy group, is conventionally meant, in the foregoing and in the following, an —O-alkyl group for which all the hydrogen atoms are replaced with fluorine atoms, this group fitting the formula —O—$C_nF_{2n+1}$, n corresponding to the number of carbon atoms, this number may range from 1 to 5, such a group may be a group of formula —O—$CF_3$ By polyoxyalkylene group, is conventionally meant, in the foregoing and in the following, a group comprising a chain sequence of units of formula —Z—O—, Z being an alkylene group.

It is specified that, by alkylene group is conventionally meant an alkyl group forming a bridge between two other groups, i.e. for which two hydrogen atoms are substituted in order to form said bridge, an example of an alkylene group may be an ethylene group of formula —CH$_2$—CH$_2$—.

An exemplary polyoxyalkylene group may be a polyoxyethylene group, i.e. a group comprising a chain sequence of units of formula —CH$_2$—CH$_2$—O—, this group may have a molar mass ranging from 130 to 2,000 g/mol.

More specifically, a particular polyoxyethylene group may be a group —(CH$_2$—CH$_2$—O)$_3$—.

By the discovery by the authors of the invention of a specific monomer (the monomer of formula (IV) defined above) capable of copolymerizing with monomers of formula (III) as defined above and allowing significant incorporation of this monomer of formula (III) into the resulting copolymer, the authors were thus able to design a novel polymerization method with simple and inexpensive application.

According to the invention, according to a particular embodiment, relating to the recurrent unit of formula (I) and the monomer of formula (III), at least two of the groups $R^1$ to $R^4$ may represent fluorine atoms advantageously. According to this embodiment, $R^1$ and $R^2$ may represent a hydrogen atom and $R^3$ and $R^4$ may represent a fluorine atom.

Thus, a particular recurrent unit falling under the general definition of the recurrent units of formula (I) may correspond to a recurrent unit of the following formula (V):

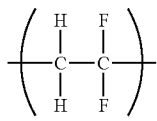

(V)

in return for which the monomer, from which stems this recurrent unit, fits the following formula (VI):

$$\begin{array}{c} H \\ \diagdown \\ H \end{array} C = C \begin{array}{c} F \\ \diagup \\ F \end{array}$$

(VI)

this monomer being known under the name of vinylidene fluoride.

Other particular recurrent units falling under the general definition of the recurrent units of formula (I) may correspond to the following particular units:
- a recurrent unit for which $R^1$, $R^2$ and $R^4$ are fluorine atoms and $R^3$ is a chlorine or bromine atom, in which case the monomer, from which stems this recurrent unit, is chlorotrifluoroethylene (known under the acronym of CTFE) or bromotrifluoroethylene;
- a recurrent unit for which $R^1$, $R^3$ and $R^4$ are fluorine atoms and $R^2$ is a group —CF$_3$, in which case the monomer, from which stems this recurrent unit, is hexafluoropropylene (known under the acronym of HFP);
- a recurrent unit for which $R^1$, $R^2$ and $R^3$ are fluorine atoms and $R^4$ is a hydrogen atom, in which case the monomer, from which stems this recurrent unit, is trifluoroethylene (known under the acronym of TrFE);
- a recurrent unit for which $R^1$ to $R^4$ are fluorine atoms, in which case the monomer from which stems this recurrent unit, is tetrafluoroethylene (known under the acronym of TFE);
- a recurrent unit for which $R^1$ to $R^3$ are fluorine atoms and $R^4$ is a group —OCF$_3$;
- a recurrent unit for which $R^1$ to $R^3$ are hydrogen atoms and $R^4$ is a fluorine atom;
- a recurrent unit for which $R^1$ to $R^3$ are hydrogen atoms and $R^4$ is a group —CF$_3$;
- a recurrent unit for which $R^1$ and $R^3$ are fluorine atoms and $R^2$ and $R^4$ are chlorine atoms;
- a recurrent unit for which $R^1$ and $R^2$ are fluorine atoms, $R^3$ is a hydrogen atom and $R^4$ is a bromine atom.

According to the invention, as regards the recurrent unit of formula (II) and the monomer of formula (IV), W may be a polyoxyethylene group, i.e. a group comprising a chain sequence of recurrent units of formula —CH$_2$—CH$_2$—O—. As an example, W may be a group of formula —(CH$_2$—CH$_2$—O)$_3$—.

Advantageously, when $R^5$ and $R^6$ are hydrogen atoms, $R^7$ is a perfluoroalkyl group.

In particular, $R^7$ may represent a perfluoroalkyl group, such as a group —CF$_3$ and $R^8$ an alkyl group, for example of the methyl type.

Thus, a particular unit falling under the general definition of the recurrent units of formula (II) may correspond to a recurrent unit of the following formula (VII):

$$\left(\begin{array}{cc} H & R^7 \\ | & | \\ -C-C- \\ | & | \\ H & C=O \\ & | \\ & O \\ & | \\ & W \\ & | \\ & R^8 \end{array}\right)$$

(VII)

wherein $R^7$ is a perfluoroalkyl group, W is a polyoxyethylene group and $R^8$ is an alkyl group, for example a methyl group or a hydrogen atom, in return for which the monomer, from which stems this recurrent unit, fits the following formula (VIII):

$$H_3C = C \begin{array}{c} R^7 \\ \diagup \\ \diagdown \\ C - O - W - R^8 \\ \diagdown \\ O \end{array}$$

(VIII)

$R^7$, $R^8$ and W being as defined above.

In particular $R^7$ may be a group —CF$_3$ and $R^8$ may be a group —CH$_3$ or a hydrogen atom.

According to other particular embodiments:
- $R^5$ is a fluorine atom, $R^6$ is a hydrogen atom and $R^7$ is a group —CF$_3$;
- $R^5$ is a fluorine atom, $R^6$ is a hydrogen atom and $R^7$ is a fluorine atom; or
- $R^5$ and $R^6$ are fluorine atoms and $R^7$ is a group —CF$_3$.

The polymerization step is advantageously accomplished in the presence of a radical polymerization initiator, which may be selected from:
- peroxypivalate compounds such as tert-butyl peroxypivalate, t-amyl peroxypivalate;
- peroxide compounds, such as di-tert-butyl peroxide, tert-butylperoxy-2,5-dimethylhexane and benzoyl peroxide;

persulfate compounds, such as potassium persulfate, sodium persulfate or ammonium persulfate;

azoic compounds, such as azobisisobutyronitrile (known under the acronym of AiBN);

carbonate compounds, such as bis(4-tert-butyl cyclohexyl) peroxydicarbonate.

The polymerization step is also preferably accomplished in the presence of an organic solvent, such as a solvent selected from the following solvents:

acetonitrile;

a halogenated solvent, such as 1,1,1,3,3-pentafluorobutane, trifluorotoluene, perfluorohexane, perfluoroheptane, 1,1,2-trifluorotrichloroethane;

a ketone solvent, such as cyclohexanone;

an ester solvent, such as methyl acetate;

an alcohol solvent such as hexafluoroisopropanol; and mixtures thereof.

The polymerization step may also be accomplished, in the presence of a chain transfer agent, in which case this polymerization step may be considered as being part of controlled radical polymerization techniques, insofar that the chain transfer agent will allow regulation of the molar mass of the obtained polymer chains.

More specifically, the controlled radical polymerization allows reduction of the reactions for deactivating the growing radical species, reactions which, in conventional radical polymerization (i.e., a radical polymerization not involving control or anti-radical agents), interrupt the growth of the polymer chain irreversibly and without any control by recombination of radicals or dismutation.

By the action of a control agent of the chain transfer agent type, the latter may transiently and reversibly block the growing radical species by reacting with the latter in order to form a group bound to the growing species through a low energy dissociation bond. This thereby gives the possibility of restarting the polymerization and thus obtaining better rates of conversion, a controlled number average molar mass (or mass average molar mass) and a polymolecularity index which is lower than in conventional radical polymerization.

Chain transfer agents which may be used for the method of the invention may be alkyl halide compounds, in particular compounds of the perfluoroalkyl iodide type, such as $CF_3I$, $C_4F_9I$, $C_6F_{13}I$, $C_2F_5I$, $(CF_3)_2CFI$, $IC_4F_8I$ or $IC_6F_{12}I$. Furthermore, these chain transfer agents allow grafting of perfluoroalkyl groups at the end of the polymer chain, which will allow determination of the molar mass of the copolymer obtained by $^{19}F$ fluorine NMR spectroscopy.

According to the nature of the solvent used and of the monomers, the polymerization may take place according to the principle of solution polymerization (from the moment that at least one of the monomers is soluble in the solvent used), the principle of suspension polymerization (from the moment that the monomers and the formed copolymers are insoluble in the dispersant) or the principle of emulsion polymerization (which is expressed by the occurrence of micelles <<trapping>> the monomer molecules before polymerization). For emulsion polymerization, a particularly suitable free radical initiator is a persulfate compound, such as a sodium, potassium or ammonium persulfate compound.

When at least one of the monomers appears in gaseous form (this is notably the case of vinylidene fluoride, trifluoroethylene, chlorotrifluoroethylene or hexafluoropropene), the polymerization step may be carried out in an autoclave, for example under pressure, the pressure in the autoclave may range from 5 to 85 bars, preferably from 10 to 55 bars, and at a temperature which may range from 40 to 150° C.

In addition to the fact that the method of the invention is innovative, the copolymers obtained by this method are also novel, because of the incorporation into these copolymers of at least one recurrent unit stemming from the polymerization of at least one monomer of the aforementioned formula (IV).

Thus, the invention according to a second object, relates to copolymers comprising at least one recurrent unit fitting the following formula (I):

wherein:

$R^1$, $R^2$, $R^3$ and $R^4$ represent independently a hydrogen atom, a halogen atom, a perfluoroalkyl group or a perfluoroalkoxy group provided that at least one of the groups $R^1$ to $R^4$ represents a fluorine atom, a perfluoroalkyl group or a perfluoroalkoxy group, and comprising at least one recurrent unit fitting the following formula (II):

wherein:

$R^5$, $R^6$, $R^7$ represent independently a hydrogen atom, a halogen atom, an alkyl group, a perfluoroalkyl group, with the proviso that at least one of the groups $R^5$ to $R^7$ represents a fluorine atom or a perfluoroalkyl group;

W represents a polyoxyalkylene group; and $R^8$ represents an alkyl group or a hydrogen atom.

Like earlier for the method described above, as regards the recurrent unit for formula (I), at least two of the groups $R^1$ to $R^4$ may advantageously represent fluorine atoms. According to this embodiment, $R^1$ and $R^2$ may represent a hydrogen atom and $R^3$ and $R^4$ may represent a fluorine atom.

Thus, a particular recurrent unit falling under the general definition of the recurrent units of formula (I) may correspond to a recurrent unit of the following formula (V):

According to the invention, as regards the recurrent unit of formula (II), W may be a polyoxyethylene group, i.e. a group comprising a chain sequence of recurrent units of formula $—CH_2—CH_2—O$, the polyoxyethylene chain may have a molar mass varying from 130 to 2,000 g·mol$^{-1}$.

As an example, W may be a group of formula —(CH$_2$—CH$_2$—O)$_3$—.

Advantageously, when R$^5$ and R$^6$ are hydrogen atoms, R$^7$ is a perfluoroalkyl group.

In particular, R$^7$ may represent a perfluoroalkyl group, such as a group —CF$_3$ and R$^8$ is an alkyl group, for example of the methyl type.

Thus, a particular recurrent unit falling under the general definition of the recurrent units of formula (II) may correspond to a unit of the following formula (VII):

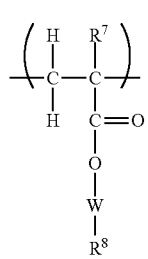

(VII)

wherein R$^7$ is a perfluoroalkyl group, such as a group —CF$_3$, W is a polyoxyethylene group and R$^8$ is an alkyl group, for example a methyl group.

According to other particular embodiments:
- R$^5$ is a fluorine atom, R$^6$ is a hydrogen atom and R$^7$ is a group —CF$_3$;
- R$^5$ is a fluorine atom, R$^6$ is a hydrogen atom and R$^7$ is a fluorine atom; or
- R$^5$ and R$^6$ are fluorine atoms and R$^7$ is a group —CF$_3$.

Other particular recurrent units falling under the general definition of the recurrent units of formula (I) may correspond to the following particular units:
- a recurrent unit for which R$^1$, R$^2$ and R$^4$ are fluorine atoms and R$^3$ is a chlorine or bromine atom;
- a recurrent unit for which R$^1$, R$^3$ and R$^4$ are fluorine atoms and R$^2$ is a group —CF$_3$;
- a recurrent unit for which R$^1$, R$^2$ and R$^3$ are fluorine atoms and R$^4$ is a hydrogen atom;
- a recurrent unit for which R$^1$ to R$^4$ are fluorine atoms;
- a recurrent unit for which R$^1$ to R$^3$ are fluorine atoms and R$^4$ is a group —OCF$_3$;
- a recurrent unit for which R$^1$ to R$^3$ are hydrogen atoms and R$^4$ is a fluorine atom;
- a recurrent unit for which R$^1$ to R$^3$ are hydrogen atoms and R$^4$ is a group —CF$_3$;
- a recurrent unit for which R$^1$ and R$^3$ are fluorine atoms and R$^2$ and R$^4$ are chlorine atoms;
- a recurrent unit for which R$^1$ and R$^2$ are fluorine atoms, R$^3$ is a hydrogen atom and R$^4$ is a bromine atom.

The copolymers of the invention may comprise from 40 to 99 mol % of recurrent unit of formula (I) and from 1 to 60 mol % of recurrent unit of formula (II).

The molar mass of the copolymers of the invention may range from 600 to 350,000 g·mol$^{-1}$.

The copolymers of the invention may optionally be random or statistical copolymers.

Such copolymers have lower crystallinity characteristics as compared with a polymer only comprising units of formula (I) as defined above by the presence of units comprising a pendant chain of the polyoxyalkylene type, said chains being, in parallel, capable of complexing ions which makes these copolymers particularly attractive for forming ion exchange membranes, whether this be for:

- the field of energy production, in particular of secondary batteries, such as lithium batteries, where the copolymers of the invention may enter the composition of the electrolytes as a gel electrolyte and/or as a separator; or
- the field of the purification of liquids contaminated with ions to be removed, wherein the copolymers may enter the composition of the filtration membranes.

Other applications of the copolymers may also be contemplated such as the field of compatibilizing or emulsifying adjuvants for polymeric mixtures.

As mentioned above, the method of the invention was able to be set up by the design of novel monomers, which monomers fit the following formula (IV):

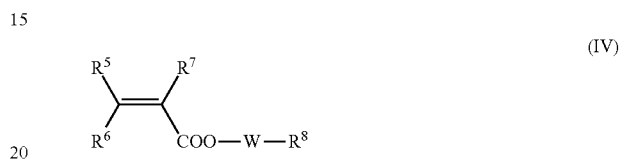

(IV)

the groups R$^5$, R$^6$, R$^7$, R$^8$ and W are as defined above.

These monomers may be prepared by a method comprising a step for reacting a monomer of the following formula (XVII):

(XVII)

wherein R$^5$, R$^6$, R$^7$ are as defined above and X is a halogen atom, a group —OH, this monomer may exist as a salt, with a compound of the following formula (XVIII):

Z—W—R$^8$ (XVIII)

wherein:
Z is a group capable of reacting with the group —CO—X of the monomer defined above in order to form an ester group;
W and R$^8$ are as defined above.

In particular, Z may be a hydroxyl group —OH.

The esterification step may be carried out in an acid medium, notably in the presence of a mineral acid such as hydrochloric acid, an organic acid and more particularly a sulfonic acid such as methanesulfonic acid, paratoluenesulfonic acid and trifluoromethanesulfonic acid (also known as triflic acid).

When X corresponds to —OH, the esterification step may also be carried out in the presence of a coupling agent, such as dicyclohexylcarbodiimide (symbolized as DCC or DCCI), a coupling agent being capable of activating the carboxyl function so as to facilitate the esterification step.

The invention will now be described with reference to the examples below given as an illustration and not as a limitation.

DETAILED DISCUSSION OF PARTICULAR EMBODIMENTS

The examples which follow illustrate different methods for preparing monomers and copolymers according to the invention.

The obtained products were able, depending on the cases, to be characterized by nuclear magnetic resonance spectroscopy (NMR) of fluorine $^{19}$F and of hydrogen $^1$H. The spectra were recorded on a spectrometer Bruker AC 400 (400 MHz), by using deuterated acetone or chloroform as a solvent and trimethylsilane (TMS) as a reference for the $^1$H NMR (or $^{19}$F NMR) spectra. The coupling constants and the chemical shifts are given in Hz and ppm, respectively. The experimental conditions for the $^1$H NMR (or $^{19}$F NMR) spectra are the following: flip angle of 90° (30°), acquisition time 4.5 s (or 0.7 s), pulse delay 2 s (or 5 s), number of scans 16 (or 64) and a pulse width of 5 µs for $^{19}$F NMR.

The obtained products were, depending on the cases, characterized by steric exclusion chromatography (symbolized as SEC) by means of a Spectra-Physics apparatus equipped with two 5 µm PLgel columns from Polymer Laboratories and with a Spectra Physics SP8430 refractive index detector. Dimethylformamide containing 0.1M of LiCl at a temperature of 70° C. or tetrahydrofurane at room temperature were selected as eluents with a flow of 0.8 mL·min$^{-1}$. The standards are isomolecular polystyrenes provided by Polymer Laboratories.

Example 1

This example illustrates the synthesis of a monomer of the following formula:

n corresponding to the number of recurrent units taken between square brackets, i.e. n being equal to 50, from the following main reagents:

α-hydroxyl-ω-methoxyl poly(oxyethylene) (symbolized hereafter as HO—POE-CH$_3$) of the following formula:

n having the same meaning as the one given above and this compound having a molar mass of 2,200 g/mol;

α-trifluoromethacrylic acid of the following formula:

methanesulfonic acid of formula CH$_3$—SO$_3$H

The specified operating procedure is the following.

In an Dean-Stark apparatus, 52.0 g (0.026 mol) of HO—POE-CH$_3$, 18.16 g (0.129 mol) of α-trifluoromethacrylic acid, 0.52 g (5.4 mmol) of methanesulfonic acid are mixed in 200 mL of toluene. After reflux for 48 hours, the crude reaction mixture is cooled and concentrated by evaporation of the toluene. The macromonomer H$_2$C=C(CF$_3$)CO$_2$—POE is then purified by precipitation from diethyl ether.

After drying the product until the mass is constant, 46.4 g of white powder were obtained with a yield of 90%.

The obtained product was analyzed by $^1$H NMR analysis, the spectrum showing:

the occurrence of a triplet at about 4.3 ppm, which may be ascribed to the group —CH$_2$— located in the α position of the oxygen of the ester group —COO—;

the presence of two singlets centered at 6.4 and 6.7 ppm respectively, which may be ascribed to the protons of the double bond.

The obtained product was also analyzed by $^{19}$F NMR, which shows a signal at −65.8 ppm, this signal being characteristic of the group —CF$_3$.

Example 2

This example illustrates the synthesis of a monomer of the following formula:

n corresponding to the number of recurrent units taken between square brackets (i.e. 50 in this case), from the following main reagents:

ω-hydroxylated poly(oxyethylene) (symbolized hereafter by HO—POE-CH$_3$) of the following formula:

n having the same meaning as the one given above and this compound having a molar mass of 2,200 g/mol;

α-trifluoromethacrylic acid of the following formula:

p-toluenesulfonic acid of the following formula:

The specified operating procedure is the following.

In a Dean-Stark apparatus, 31.2 g (0.016 mol) of HO—POE-CH$_3$, 10.9 g (0.077 mol) of α-trifluoromethacrylic acid, 0.60 g (3.4 mmol) of paratoluenesulfonic acid are mixed in 100 mL of toluene. After reflux for 48 hours, the reaction crude is cooled and concentrated by evaporating the toluene. The macromonomer H$_2$C=C(CF$_3$)CO$_2$—POE is then purified by precipitation in diethyl ether.

After drying the product until the mass is constant, 29.2 g of a white powder were obtained with a yield of 73%.

The $^1$H NMR and $^{19}$F NMR spectra obtained have similar characteristics to those obtained for the monomer of Example 1.

Example 3

This example illustrates the synthesis of a monomer of the following formula:

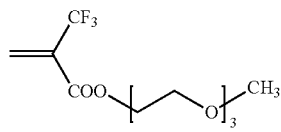

designated as trioxa-3,6,9-decyl α-trifluoro-methacrylate from the following main reagents:
trioxa-3,6,9-decan-1-ol of the following formula:

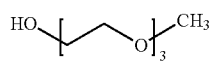

α-trifluoromethacrylic acid of the following formula:

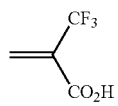

methanesulfonic acid of the following formula $CH_3$—$SO_3H$

The specified operating procedure is the following.

In a Dean-Stark apparatus, 10.0 g (60.9 mmol) of trioxa-3,6,9-decan-1-ol, 17.0 g (121.4 mmol) of α-trifluoromethacrylic acid, 290 mg (3.02 mmol) of methanesulfonic acid, 10 mg (4.5 mmol) of 2,6-di-tert-butyl-4-methylphenol, are mixed in 120 mL of toluene with reflux at 140° C. for 2 days. The crude reaction mixture is then cooled and concentrated by evaporation of the toluene in vacuo. The excess of α-trifluoromethacrylic acid is removed by sublimation.

The trioxa-3,6,9-decyl α-trifluoro-methacrylate is finally obtained as a colorless liquid after distillation under pressure (65° C., 40 mbars) with a yield of 50% (8.8 g).

Example 4

This example illustrates the preparation of a copolymer by radical copolymerization of the monomer, vinylidene fluoride $CH_2$=$CF_2$ with the monomer prepared in Example 1.

Copolymerization is carried out in an autoclave in Hastelloy (HC 276) equipped with a pressure gauge, a bursting disc, a mechanical stirrer, valves for introducing gas and for degassing in a reactor of 100 mL.

The reactor is degassed beforehand followed by three vacuum-argon cycles.

Next, the reaction mixture comprising 21.2 g (9.7 mmol) of monomer prepared according to Example 1, 0.58 g (4.0 mmol) of tert-butyl peroxypivalate and 50 mL of acetonitrile is introduced into the reactor.

And then, the reactor is again put under argon and then degassed before introducing 18 g (0.28 mol) of vinylidene fluoride (VDF). The initial VDF/monomer molar ratio of Example 1 is 98/2 mol/mol. The reactor is gradually heated with stirring to 75° C. and maintained at this temperature for at least 6 hours. During the heating, the pressure increases up to a maximum of 28 bars and then drops down to 22 bars.

The reactor is then cooled, introduced into an ice bath for 40 minutes and then degassed.

After opening the reactor, the solvent of the reaction crude is evaporated, and the copolymer is then precipitated from 500 mL of cold pentane with strong stirring, which leads, after filtration, to a white powder (13.7 g) (35% yield).

The NMR analysis gave the possibility of determining that 99.6 mol % of VDF and 0.4 mol % of monomer of Example 1 were incorporated into the copolymer.

SEC analysis (THF, 30° C., polystyrene standard) shows a signal corresponding to a number average molar mass of 9,700 g/mol, the polymolecularity index being 1.83.

Example 5

The apparatus used in this example is identical with the one used in Example 4.

The reagents introduced into the reactor are the following:
5.08 g (2.4 mmol) of the monomer prepared in Example 1;
0.75 g (4.8 mmol) of t-butyl peroxide;
60 mL of acetonitrile.

After having put the reactor under argon followed by degassing, 18 g (0.28 mol) of vinylidene fluoride are added. The initial VDF/monomer molar ratio of Example 1 is 98.2 mol/mol. The reactor is gradually heated with stirring to 140° C. and maintained at this temperature for at least 8 hours. During the heating, an exothermic reaction is observed being characterized, in a first phase, by an increase in the pressure (up to a maximum value or 43 bars) then followed by a pressure drop (down to a value of 18 bars).

After degassing, 12 grams of VDF are released (the conversion rate thus being 33%), and after opening, the obtained product is purified by precipitation from pentane.

The $^1$H NMR analysis gave the possibility of determining that 99 mol % of VDF and 1 mol % of the monomer of Example 1 were incorporated into the copolymer.

The SEC analysis (THF, 30° C., polystyrene standard) shows a signal corresponding to a number average molar mass of 7,000 g/mol, the polymolecularity index being 1.98.

Example 6

This example was carried out in 1,1,1,3,3-pentafluorobutane with the same proportions of VDF, of monomer of Example 3 and of t-BPPi as for Example 4.

During the heating, an exothermic reaction is observed, being characterized, in a first phase, by an increase in the pressure (up to a maximum value of 12 bars) then followed by a pressure drop (down to a value of 8 bars).

At the end of the experiment, the reaction mixture appears as a white foam. The 1,1,1,3,3-pentafluorobutane is then removed by distillation, the resulting residue is solubilized in dimethylformamide (DMF) and then precipitated from 400 mL of methanol. The whole is filtered and the filtrate is again concentrated so as to be precipitated from the pentane in order to give a second precipitate, which is then isolated.

The $^1$H NMR analysis of the second precipitate in $CDCl_3$ shows the characteristic peaks of the recurrent units stemming from the monomer of Example 3 and of units stemming from VDF.

The SEC analysis (THF, 30° C., polystyrene standard) shows a signal corresponding to a number average molar mass of 10,100 g/mol, the polymolecularity index being 1.86.

Example 7

Under conditions similar to those of Example 4, 56.5 g (19.7 mmol) of monomer prepared in Example 3, 0.22 g (1.4 mmol) of t-butyl peroxypivalate, 0.21 g of t-butyl peroxide, 150 mL of deionized water and 5 mL of 1,1,1,3,3-pentafluorobutane are introduced into the 300 mL reactor in Hastelloy.

And then, the reactor is again put under argon and then degassed before introducing 6 g (93.7 mmol) of vinylidene fluoride. The initial VDF/monomer molar ratio of Example 1 is 82/18 mol/mol. The reactor is gradually heated with stirring to 74° C. for 3 hours in a first phase and then, to 140° C. at this temperature for 8 hours.

During the heating, the pressure increases up to a maximum of 43 bars and then drops down to 12 bars.

After degassing, 1 gram of VDF is released (the conversion rate thus being 78%) and after opening the reactor, the reaction medium appears as a homogeneous liquid. This homogeneous liquid is then freeze-dried in order to obtain a viscous liquid.

This liquid is set to precipitate from 1,1,1,3,3-pentafluorobutane in order to obtain 45.1 g of wax crystallizing at 26° C. (Yield=72%).

SEC analysis (THF, 30° C., polystyrene standard) shows a signal corresponding to a number average molar mass of 12,000 g/mol, the polymolecularity index being 2.05.

Example 8

Under conditions similar to those of Example 4, 0.62 g (1.4 mmol) of $C_6F_{13}I$, 10 g (0.0156 mol) of VDF, 17.6 g (0.0275 mol) of monomer prepared in Example 3 and 0.99 g (3.6 mmol) of potassium persulfate are introduced into the autoclave. The reactor is gradually heated up to 80° C. and this for hours. The maximum pressure is 28 bars and then drops down to 9 bars. After cooling and degassing, the reactor is opened and the powder is filtered, washed with methanol, solubilized in acetone and precipitated from 500 mL of cold pentane. At the end of these operations, 9.2 g of white powder are obtained. The yield is 33%.

$^1$H and $^{19}$F NMR analysis gave the possibility of determining that 89 mol % of VDF and 11 mol % of monomer of Example 3 were incorporated into the copolymer.

SEC analysis (THF, 30° C., polystyrene standard) shows a signal corresponding to a number average molar mass of 2,500 g/mol, the polymolecularity index being 1.7.

Example 9

In an autoclave of 100 mL left in vacuo beforehand for 30 minutes, are introduced 8.0 g (27.9 mmol) of monomer prepared according to Example 3, 700 mg (3.02 mmol) of tert-butyl peroxypivalate initiator in 70% of isododecane dissolved in 60 g of 1,1,1,3,3-pentafluorobutane and 10 g (0.156 mol) of vinylidene fluoride.

The initial VDF/monomer molar ratio of Example 1 is 85/15 mol/mol. The reactor is gradually heated with stirring up to 74° C., a temperature at which a pressure of 11 bars is observed. This temperature is maintained constant for 17 hours, during which the pressure drops by 4 bars. After cooling to room temperature, the reactor is placed in an ice bath.

After opening the reactor, the solvent of the reaction crude is evaporated, the residue taken up in acetone and then precipitated from cold pentane leading to a pale yellow elastomer.

After isolation and drying in vacuo (at 40 mbars) at 50° C. for 6 hours, a yellow wax is obtained with a yield of 55% (10.0 g).

$^{19}$F NMR analysis gave the possibility of determining that 64 mol % of VDF and 46 mol % of monomer of Example 3 had been incorporated into the copolymer.

The invention claimed is:

1. A method for preparing a copolymer comprising at least one recurrent unit fitting the following formula (I):

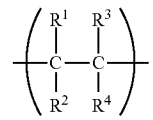

wherein:
$R^1$, $R^2$, $R^3$ and $R^4$ represent independently a hydrogen atom, a halogen atom, a perfluoroalkyl group or a perfluoroalkoxy group, provided that at least one of the groups $R^1$ to $R^4$ represents a fluorine atom, a perfluoroalkyl group or a perfluoroalkoxy group, and comprising at least one recurrent unit fitting the following formula (II):

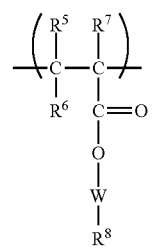

wherein:
$R^5$, $R^6$, $R^7$ represent independently a hydrogen atom, a halogen atom, an alkyl group, a perfluoroalkyl group, with the proviso that at least one of the groups $R^5$ to $R^7$ represents a fluorine atom or a perfluoroalkyl group;
W represents a polyoxyalkylene group which is a chain sequence of units of formula —Z—O—, wherein Z is an alkylene group; and
$R^8$ represents an alkyl group or a hydrogen atom, said method comprising a step for copolymerizing at least one monomer of following formula (III):

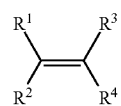

and of at least one monomer of the following formula (IV):

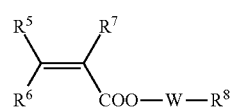

the groups $R^1$, $R^2$, $R^3$, $R^4$, $R^5$, $R^6$, $R^7$, W and $R^8$ being as defined above.

2. The method according to claim 1, wherein at least two of the groups $R^1$ to $R^4$ represent fluorine atoms.

3. The method according to claim 1, wherein $R^1$ and $R^2$ represent a hydrogen atom and $R^3$ and $R^4$ represent a fluorine atom.

4. The method according to claim 1, wherein W is a polyoxyethylene group.

5. The method according to claim 1, wherein $R^7$ represents a perfluoroalkyl group and $R^8$ represents an alkyl group.

6. The method according to claim 5, wherein $R^7$ represents a group —$CF_3$.

7. The method according to claim 1, wherein $R^5$ and $R^6$ represent a hydrogen atom.

8. A copolymer comprising at least one recurrent unit fitting the following formula (I):

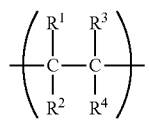
(I)

wherein:
$R^1$, $R^2$, $R^3$ and $R^4$ represent independently a hydrogen atom, a halogen atom, a perfluoroalkyl group or a perfluoroalkoxy group, provided that at least one of the groups $R^1$ to $R^4$ represents a fluorine atom, a perfluoroalkyl group or a perfluoroalkoxy group, and comprising at least one recurrent unit fitting the following formula (II):

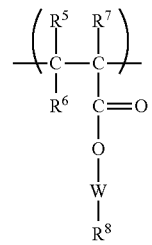
(II)

wherein:
$R^5$, $R^6$, $R^7$ represents independently a hydrogen atom, a halogen atom, an alkyl group, a perfluoroalkyl group, with the proviso that at least one of the groups $R^5$ to $R^7$ represents a fluorine atom or a perfluoroalkyl group;
W represents a polyoxyalkylene group which is a chain sequence of units of formula —Z—O—, wherein Z is an alkylene group; and
$R^8$ represents an alkyl group or a hydrogen atom.

9. The copolymer according to claim 8, wherein at least two of the groups $R^1$ to $R^4$ represent fluorine atoms.

10. The copolymer according to claim 8, wherein $R^1$ and $R^2$ represent a hydrogen atom and $R^3$ and $R^4$ represent a fluorine atom.

11. The copolymer according to claim 8, wherein W is a polyoxyethylene group.

12. The copolymer according to claim 8, wherein $R^7$ represents a perfluoroalkyl group and $R^8$ represents an alkyl group.

13. The copolymer according to claim 12, wherein $R^7$ represents a group —$CF_3$.

14. The copolymer according to claim 8, wherein $R^5$ and $R^6$ represent a hydrogen atom.

* * * * *